(12) United States Patent
Bengtsson et al.

(10) Patent No.: US 6,347,217 B1
(45) Date of Patent: *Feb. 12, 2002

(54) LINK QUALITY REPORTING USING FRAME ERASURE RATES

(75) Inventors: Karin Agneta Bengtsson; Håkan Gunnar Olofsson, both of Stockholm; Yngve Kenneth Wallstedt, Solna; Erik Ekudden, Åkersberga, all of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/859,939

(22) Filed: May 22, 1997

(51) Int. Cl.[7] .............................. H04B 17/00; H04Q 7/00
(52) U.S. Cl. ................. 455/67.7; 455/67.1; 455/226.4; 370/333; 375/224
(58) Field of Search ............................ 455/566, 226.4, 455/226.3, 226.1, 67.1, 67.3, 423, 436, 67.7, 11.1, 560; 375/224, 227, 228; 370/332, 333

(56) References Cited

U.S. PATENT DOCUMENTS

| | | | |
|---|---|---|---|
| 4,140,973 A | * 2/1979 | Stevens | 455/62 |
| 4,328,581 A | * 5/1982 | Harmon et al. | 371/5.5 |
| 4,633,411 A | * 12/1986 | Bliss et al. | 702/77 |
| 4,633,463 A | * 12/1986 | Mack | 370/333 |
| 4,744,083 A | * 5/1988 | O'Neill et al. | 371/5.1 |
| 4,780,885 A | * 10/1988 | Paul et al. | 375/267 |
| 4,789,948 A | * 12/1988 | Von Der Embse | 371/20.1 |
| 5,023,900 A | * 6/1991 | Tayloe et al. | 379/32 |
| 5,027,427 A | * 6/1991 | Shimizu | 455/517 |
| 5,095,500 A | 3/1992 | Tayloe et al. | 379/32 |
| 5,103,461 A | * 4/1992 | Tymes | 375/206 |
| 5,289,526 A | * 2/1994 | Chymyck et al. | 455/424 |
| 5,309,503 A | * 5/1994 | Bruckert et al. | 455/452 |
| 5,313,197 A | * 5/1994 | Barr et al. | 340/825.44 |
| 5,432,778 A | 7/1995 | Minde et al. | 370/95.3 |
| 5,432,843 A | 7/1995 | Bonta | 379/60 |
| 5,451,839 A | * 9/1995 | Rappaport et al. | 375/224 |
| 5,461,639 A | 10/1995 | Wheatley, III et al. | 375/205 |
| 5,469,471 A | * 11/1995 | Wheatley, III | 370/335 |
| 5,475,861 A | 12/1995 | Hall | 455/33.1 |
| 5,481,588 A | 1/1996 | Rickli et al. | 379/32 |
| 5,490,204 A | 2/1996 | Gulledge | 379/59 |
| 5,533,027 A | * 7/1996 | Akerberg et al. | 370/347 |
| 5,603,095 A | * 2/1997 | Uola | 455/67.1 |
| 5,623,484 A | * 4/1997 | Muszynski | 370/335 |
| 5,630,210 A | * 5/1997 | Marry et al. | 455/67.3 |
| 5,640,684 A | * 6/1997 | Konosu et al. | 455/67.7 |
| 5,644,599 A | * 7/1997 | Hess | 375/267 |
| 5,671,219 A | * 9/1997 | Jensen et al. | 370/280 |
| 5,677,912 A | * 10/1997 | Smith | 714/712 |
| 5,694,451 A | * 12/1997 | Arinell | 379/34 |

(List continued on next page.)

FOREIGN PATENT DOCUMENTS

| | | |
|---|---|---|
| WO | 93/15569 | * 8/1993 |
| WO | WO95/09494 | 4/1995 |
| WO | WO95/26094 | 9/1995 |
| WO | 95/33352 | * 12/1995 |
| WO | WO96/21332 | 7/1996 |

Primary Examiner—Vivian Chang
Assistant Examiner—Charles N. Appiah
(74) Attorney, Agent, or Firm—Burns, Doane, Swecker & Mathis, L.L.P.

(57) ABSTRACT

Method and systems for reporting and analyzing link quality for radiocommunications are described. Use of frame erasure information (e.g., frame erasure rate (FER)) is highlighted. Presentation of frame erasure information can be segregated on a per-connection or per-cell basis, in addition to system-wide output. Moreover, frame erasure information can be correlated with geographical location of a mobile, the mobile's handover status or the equipment type of the mobile station to provide the network operator with a better understanding of quality issues within the network.

13 Claims, 7 Drawing Sheets

U.S. PATENT DOCUMENTS

| | | | | |
|---|---|---|---|---|
| 5,706,333 A | * | 1/1998 | Grenning et al. | 455/423 |
| 5,737,359 A | * | 4/1998 | Koivu | 375/202 |
| 5,758,264 A | * | 5/1998 | Bonta et al. | 455/67.7 |
| 5,768,684 A | * | 6/1998 | Grubb et al. | 455/13.4 |
| 5,768,688 A | * | 6/1998 | Owada | 455/67.1 |
| 5,784,406 A | * | 7/1998 | DeJaco et al. | 375/224 |
| 5,812,951 A | * | 9/1998 | Ganesan et al. | 455/445 |
| 5,881,368 A | * | 3/1999 | Grob et al. | 455/69 |
| 5,987,306 A | * | 11/1999 | Nilsen et al. | 455/67.1 |
| 6,088,588 A | * | 7/2000 | Osborne | 455/425 |

* cited by examiner

FIG. 4

```
DISPLAY FER:

(1) BY CONNECTION (2) BY CELL (3) BY SYSTEM (4) GRAPHICALLY (5) MARKING HO
```

LINK QUALITY REPORTING USING FRAME ERASURE RATES

BACKGROUND

The present invention relates to measuring and reporting link quality in a cellular telecommunication system. More particularly, the present invention relates to using frame erasure rates (also sometimes referred to as "frame error rates") in link quality measurement to improve network quality observation.

In most radiocommunication systems, such as cellular telephone systems, one or both of the base station and the mobile unit typically evaluate and report on the signal quality of the communication link (herein referred to as link quality) between the mobile and the base station. In older analog systems such as the Advanced Mobile Phone Service (AMPS) and Extended Total Access Communication System (ETACS), mobile units participate in the evaluation of link quality by transmitting a pilot tone to the base station. The base station then measures the signal strength of the pilot tone to estimate uplink and downlink signal quality.

In more contemporary digital systems such as the Global System for Mobile communication (GSM), used as a standard in Europe, and the Digital Advanced Mobile Phone Service (D-AMPS), used as a standard in North America, the mobile units measure the downlink quality and then report the measurements back to the base station. Typically, mobile units measure and report the bit error rate (BER). In addition to measuring and reporting the signal quality of the downlink between the base station and the mobile unit, each mobile unit is also capable of measuring and reporting the received signal strength (RSS) for a number of alternative frequency channels herein referred to as candidate channels. In a similar manner, the base station may measure the received signal strength and BER for the uplink. Both uplink and downlink quality information can then be reported to the network for storage and analysis by the operator. If necessary, remedial action can be taken at the base station to improve a connection's signal quality.

For example, if the BER for the frequency channel currently being used for the downlink is greater than desirable and the corresponding signal strength is less than desirable, the base station may take remedial action. The base station may exchange the current frequency channel with one of the candidate channels or may even decide to "handoff" the mobile unit to a neighboring base station. These remedial actions help to insure that the user of the mobile unit experiences the best possible signal quality.

To avoid taking unnecessary remedial action in response to a few poor link quality measurements, existing systems average the link quality measurements in accordance with a time constant. The time constant will, in general, vary from a few milliseconds to several seconds depending upon the data rate, the communication protocol, and the frequency of the communication channel. For example, systems operating in accordance with GSM estimate the BER for each 20 ms speech frame and average the estimated BERs over half second intervals. Unfortunately, averaging the link quality measurements made using BER information tends to present an inaccurate measure of link quality. This is especially true when the operating environment is subjected to the effects of Rayleigh fading or other time dependent interference which increase the peak-to-average ratio of the signal quality measurements by approximately 3 to 4 decibels, i.e., degrade link quality without significantly affecting the average BER measurement.

This, in turn, makes it difficult for network operators to accurately determine the actual quality perceived by users in different parts of the network. Applicants have recognized that the problems underlying these conventional link quality reporting techniques involve the usage of RSS and/or BER information to estimate perceived link quality. In particular, the correlation between these parameters and perceived signal quality may be low and, moreover, the quality of the BER estimate itself may be poor.

Accordingly, it would be desirable to provide new systems and techniques for estimating and reporting link quality in a radiocommunication system.

SUMMARY

Exemplary embodiments of the present invention provide techniques and systems for measuring and reporting frame erasures in either or both the uplink and downlink of communication channels. This information is used by the network operator to more accurately estimate perceived signal quality in the system.

According to some exemplary embodiments, the frame erasure rate is measured and reported. According to other exemplary embodiments, the time distribution of the frame erasures is also reported.

Various processing techniques are used according to the present invention to present the network operator with the link quality information needed to optimize system parameters. For example, frame erasure information can be presented on a per connection, per cell or system-wide basis. Moreover, the link quality information associated with connections that have recently been handed-off can be highlighted to alert network operators to potential problems in a particular area's handoff algorithm. If the data reported by the system to the network operator is at a higher level than the desired presentation of that data, then exemplary embodiments of the present invention provide for transforming the received data to provide an estimate of the lower level presentation data.

BRIEF DESCRIPTION OF THE DRAWINGS

The objects and advantages of the invention will be understood by reading the following detailed description in conjunction with the drawings in which:

FIG. 4 is an exemplary display menu usable by a network operator to selectively display frame erasure information;

DETAILED DESCRIPTION

The various features of the invention will now be described with respect to the figures.

Figure 1:
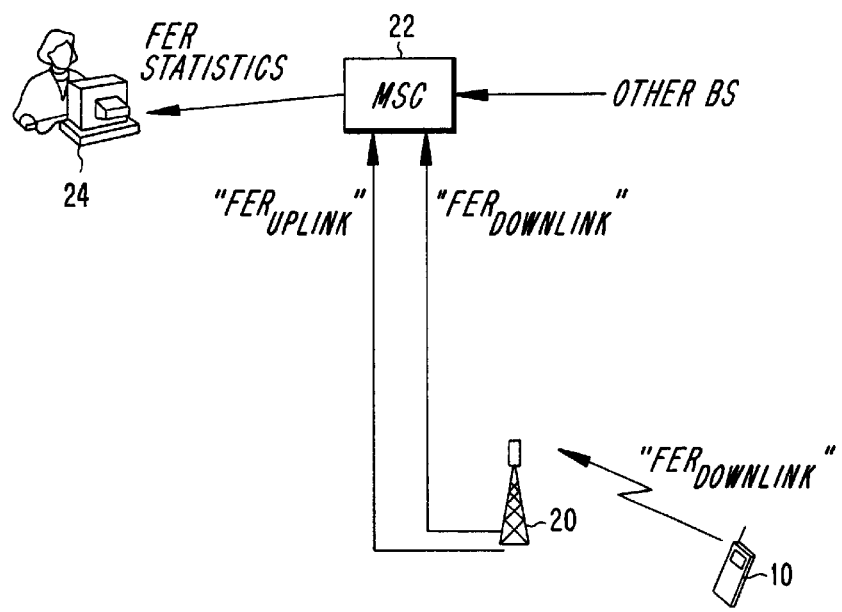
FIG. 1 illustrates elements of an exemplary radiocommunication system for reporting link quality according to the present invention.

In FIG. 1, a mobile unit 10 continuously or periodically determines signal quality values for downlink signals transmitted between a base station 20 and the mobile unit 10 by calculating the frame erasure rate (FER) for data frames received from the base station 20. Exemplary techniques for calculating the FER are described below. The mobile unit 10 will transmit the quality values back to the base station 20 along with other data, for example, the signal strength measurements of candidate frequency channels, as described above. The base station 20 may use this information to determine whether remedial action should be taken to improve the quality of the communication link between the base station 20 and the mobile unit 10. As stated previously, remedial action might involve exchanging the present frequency channel with a candidate frequency channel that is presently exhibiting better signal quality characteristics. Remedial action might otherwise involve changing channel coding and/or modulation or "handing-off" the mobile unit to a neighboring base station.

The base station 20 also measures the FER for the uplink for data frames transmitted by the mobile station 10. Base station 20 forwards the uplink and downlink, or possibly just the downlink, FER information to its mobile switching center (MSC) 22 which may itself forward the FER information to some other central node. Other base stations (not shown) whose activities are coordinated via MSC 22 will also forward link quality information to MSC 22. This information will then be processed and output, e.g., at terminal 24, so that a network operator can evaluate link quality at various levels. Exemplary processing techniques and reporting formats for the link quality information are described below.

Figure 2:
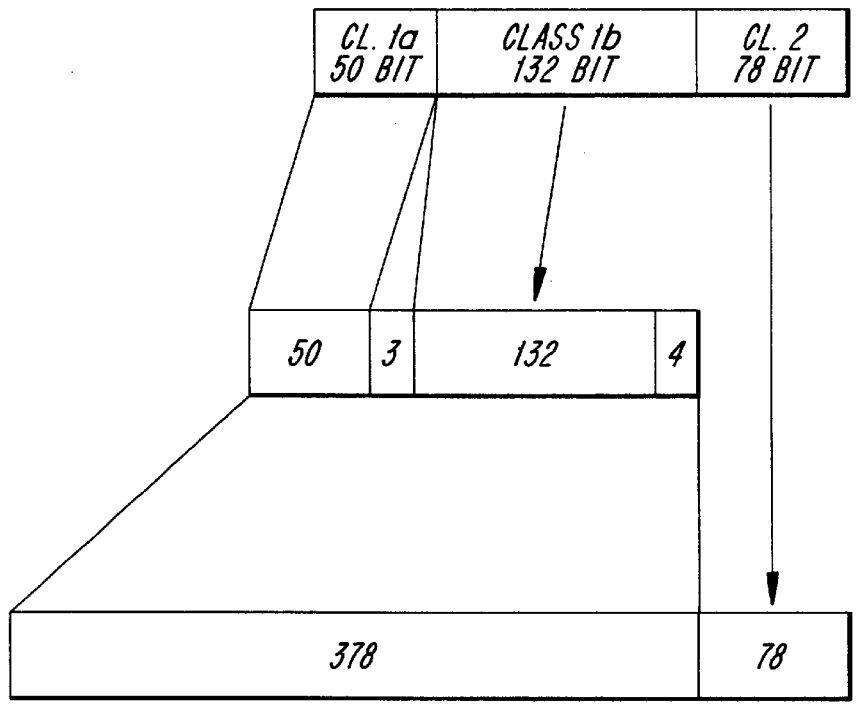
FIG. 2 depicts an exemplary GSM frame format.

Exemplary techniques for determining frame erasures will now be described. Frame erasures occur where transmission effects cause sufficient, uncorrected bit errors in a frame that the frame is discarded. Although FER can be calculated for any type of frame (e.g., speech or data) speech frames are discussed below to illustrate this technique. Shown at the top of FIG. 2 is the format for an exemplary speech frame in accordance with the GSM standard which contains 260 bits. It will be appreciated that this GSM speech frame format is used herein solely as an illustrative example and that the present invention is equally applicable to radiocommunication systems operating in accordance with other standards.

The speech frame is divided into three blocks of which each defines one of three different classes. One block of 50 bits is assigned to class 1a, one block of 132 bits is assigned to class 1b, and the remaining block of 78 bits is assigned to class 2. The 260 bits are delivered from a speech coder (not shown) and form digitized speech after speech coding. Speech frames of this kind are produced each 20 ms, which results in a net bit rate of 13 kbit/s.

Class 1a designates the block of bits (50 bits) which are most sensitive to transmission errors and which, if corrupted, cause the most problems with regard to the intelligibility of the transmitted and decoded speech. When errors are found in these bits, the frame is erased and parts of the immediately preceding, correct speech frame are repeated (downtoning). This error detection is effected using three parity bits which are added to the 50 data bits as control bits.

Class 1b designates a block of bits (132 bits) which is not protected by parity bits. However, four bits are added as so-called tail bits. These 132 data bits are less sensitive than the bits in class 1a with regard to reproduced intelligibility when corrupted by transmission errors. A convolutional code is used on the bits included in the class 1a, 1b blocks and the three parity bits and four tail bits. Class 2 designates a block of 78 bits that are the least susceptible to transmission error and are not protected at all by additional bits, as in the case of class 1a and 1b bits.

Figure 3:
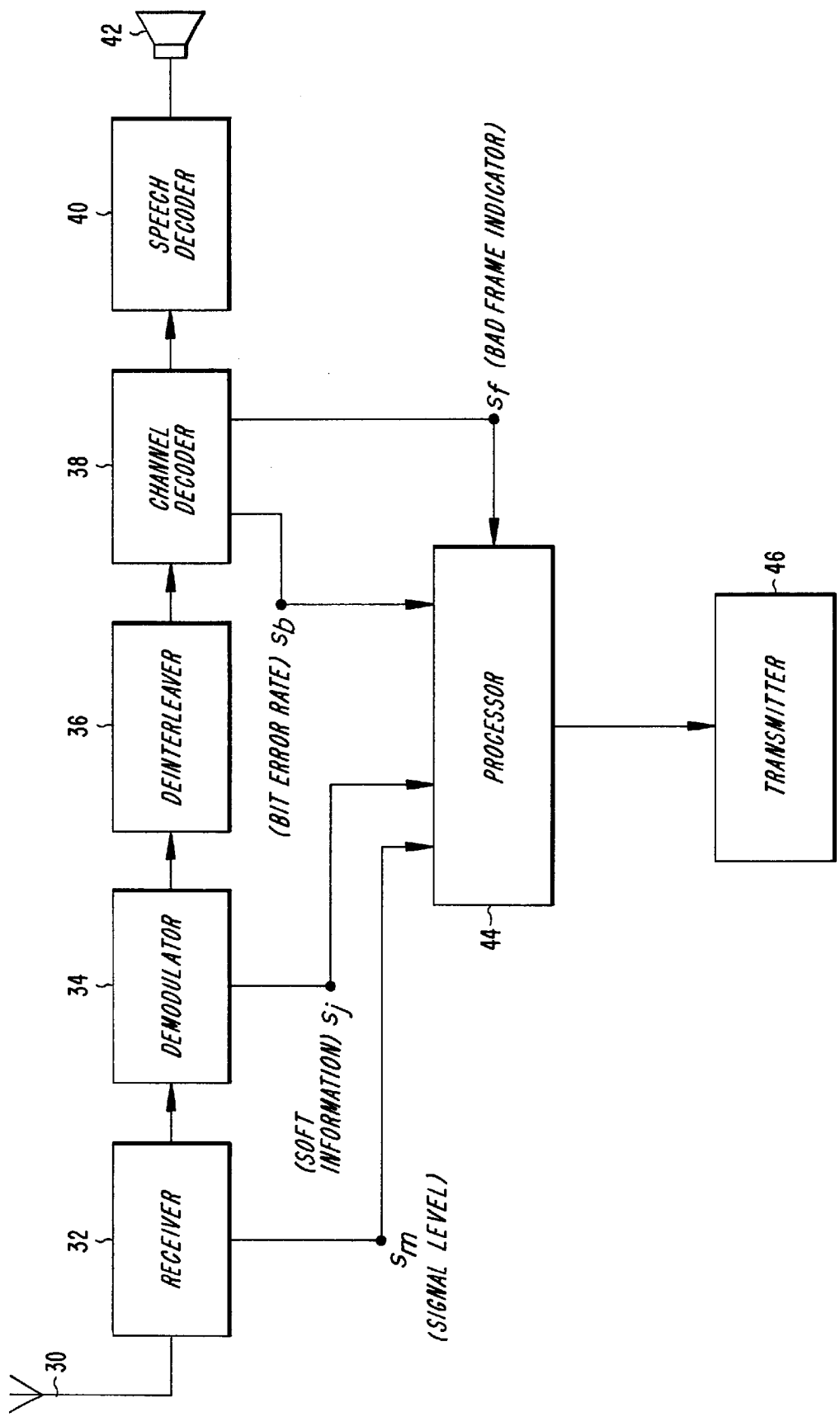
FIG. 3 is a block diagram of a portion of a receiver according to an exemplary embodiment of the present invention.

FIG. 3 is a block diagram illustrating part of a radio receiver for time division multiple access (e.g. TDMA) which processes the above-described speech frames and data frames to output reproduced speech and data and, in accordance with the present invention, to identify and report on frame erasures in the downlink.

An antenna 30 of the receiver of a mobile telephone apparatus, for instance, receives radio signals over a certain radio channel. The signals (data/speech messages) transmitted over this channel may become strongly distorted, for instance due to fading, so that the TDMA-bursts give rise to a highly distorted speech frame.

Filtering and downconversion takes place in the radio receiver 32 at a given radio frequency (e.g., in the GSM-system 865–935 MHz) in a known manner, so as to obtain a baseband modulated signal. The signal strength levels of the radio signals incoming to the radio receiver 32 can be measured and are referenced $S_m$ in FIG. 3.

The baseband modulated signal is demodulated in the demodulator 34 within the IF-range, this demodulator also including an equalizer (not shown) for compensating or correcting the multipath propagation to which the incoming signal has been subjected during transmission, in a known manner. In this regard, the signal can be equalized using a Viterbi equalizer as described in U.S. Pat. No. 5,341,401, which is incorporated here by reference.

So-called soft information is obtained from the equalizer (from, for example, a measurement of phase error) in the demodulator 34 and/or from a measurement of signal strength of the output signal of the demodulator 34, this soft information being available and referenced $S_j$ in FIG. 3.

A deinterleaver 36 is connected downstream of the demodulator/equalizer 34 and recovers the time divided bursts intended for the receiver, in a known manner. The main function of the channel decoder 38 is to perform the reverse of the operation performed by the channel coder on the transmitter side, i.e., to recover transmitted information from the known redundant bits and the known channel coding (e.g. a convolutional code). The channel decoder 38 may also estimate the bit error rate (BER), for instance by coding the received and decoded information bits and comparing the result with the bits received from the deinterleaver 36. The channel decoder 38 also provides a measurement as to how bad, or erroneous, a full speech frame is, i.e., using the so-called bad frame indicator (BFI) as specified in the GSM-recommendation 05.05. Thus, there can be produced from the channel decoder 38 a signal $S_b$ which is a measurement of the bit error rate (BER) in the received, demodulated and equalized radio signal, and a signal $S_f$ which indicates whether an error has occurred in a particular frame. This latter signal is an example of post decoding information which can be used to determine link quality, e.g., the FER.

The decoded speech frames are delivered from the channel decoder 38 to the speech decoder 40 in a known manner, speech-frame by speech-frame, where synthesis of received speech frames is effected so as to deliver speech signals to a sound reproduction unit 42 in the remote station (e.g., mobile telephone apparatus).

According to this exemplary embodiment of the present invention, the signal quality related information generated by the receiver components described above can be provided to processor 44 to determine a frame erasure (or frame error) rate. The precise manner in which one or more of the signals $S_m$, $S_j$, $S_b$ and $S_f$ are used by processor 44 to calculate the FER is beyond the scope of the present discussion. Any known technique can be employed, e.g., the techniques described in U.S. Pat. No. 5,432,778, the disclosure of which is incorporated here by reference.

Having calculated the downlink FER, processor 44 packages the FER information in a report and sends the report for transmission to transmitter circuitry 46, e.g., in a manner similar to that used to transmit BER or MAHO information conventionally. If, however, the FER is zero at any given calculation interval then an FER report need not be transmitted in order to conserve battery power. The operation and detail of transmitter 46 are well known to those skilled in the art and, therefore, will not be further described here. Transmitter 46 transmits the FER information to the base station currently servicing this remote station, whereupon it is processed as described herein.

Although the foregoing exemplary embodiments provide for link quality measurement and reporting based upon a rate of frame erasures, i.e., the number of frame erasures per unit time, other frame erasure information may be used. For speech users the distribution of frame erasures over time affects the perceived speech quality. For example, having a number of frame erasures in rapid succession may be perceived as less degrading to speech quality than spreading the same number of frame erasures out more evenly. Since the time distribution of frame erasures is known in the mobile (downlink) and the base station (uplink), a better measure of perceived speech quality than FER can be derived, e.g., a statistical distribution of frame erasures over time. This measure can then be used instead of FER for quality reporting and observation.

Having described exemplary techniques for measuring and reporting link quality using frame erasures, techniques for allowing a network operator to effectively use this information will now be described. These presentation techniques are independent of the type of link quality information which is reported by the system to the network operator. That is, although the following examples describe reports which are based upon FER information, these presentation techniques can be applied to any type of reported quality information, e.g., BER or aggregate BER information.

Consider that the network operator has access to various statistical displays, e.g., using terminal or computer 40 of FIG. 1. Options can be provided to vary the manner in which the FER information is displayed, for example using a menu interface as shown in FIG. 4.

Figure 5A:
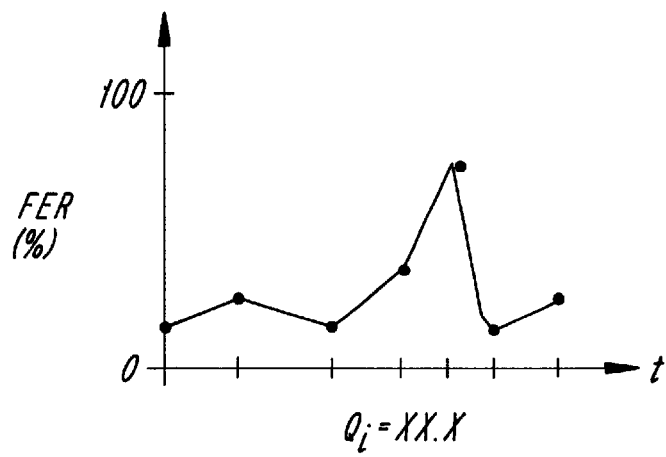
FIG. 5(a) is an exemplary output format for depicting link quality on a per connection basis.
Figure 5B:
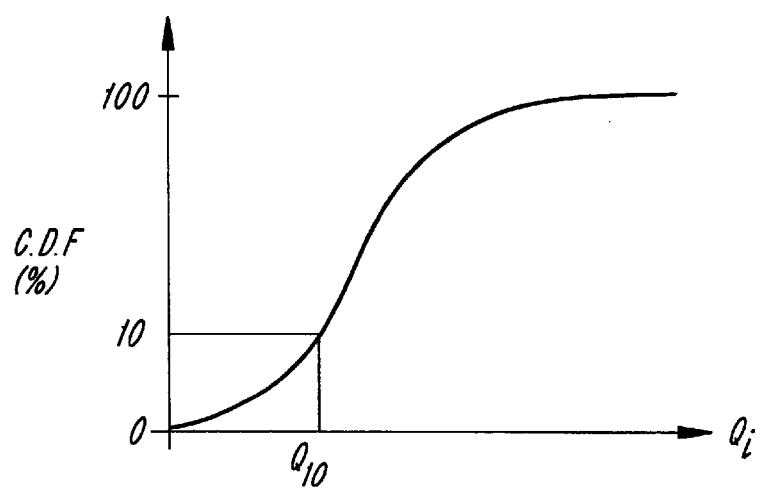
FIG. 5(b) is an exemplary output format for depicting link quality on a per cell or cell group basis.
Figure 5C:
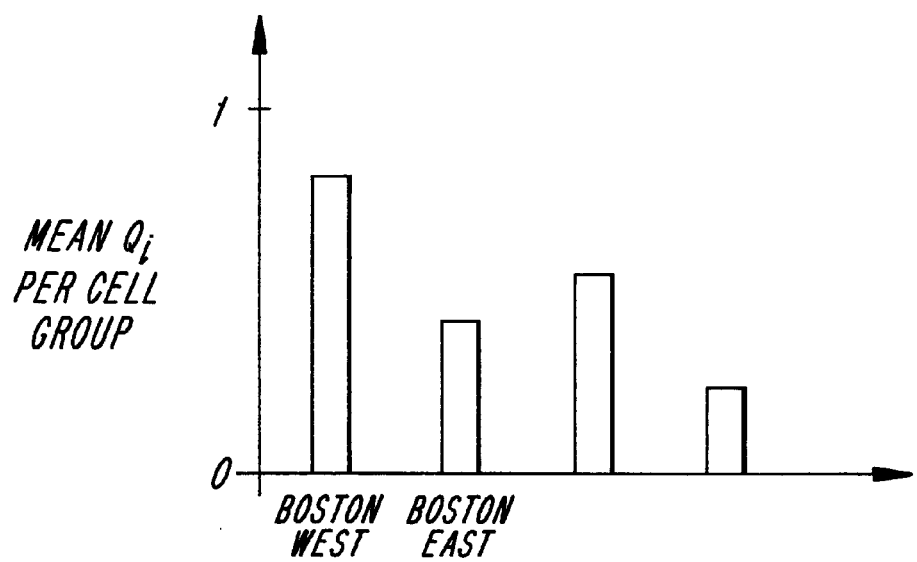
FIG. 5(c) is an exemplary output format for depicting link quality on a system-wide basis.

It may be advantageous to display the quality of each connection separately. For example, a perceived quality function $Q_i$ could be computed as a function of the FER samples, which samples can be graphed over time and displayed with the computed value of $Q_i$ as illustrated in FIG. 5(a). Alternatively, it may be desirable to depict the perceived quality on a cell (or group of cells) basis. For example, FIG. 5(b) depicts a graph of a cumulative distribution function (C.D.F.) versus quality for a particular cell or group of cells wherein a correspondence between 10% of the connections in this cell or group of cells correspond to a particular perceived quality value $Q_{10}$. Moreover, it may sometimes be desirable to depict quality on a system-wide basis as exemplified by FIG. 5(c). Accordingly, selectability of the estimated quality for particular connections, particular cells and the complete system should preferably be made available for presentation at terminal 40 in a hierarchical manner as indicated by selections (1)–(3) in FIG. 4.

Figure 5D:
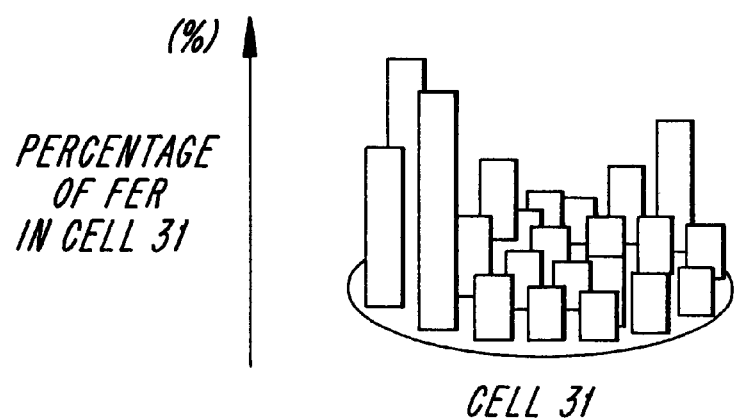
FIG. 5(d) is an exemplary output format for depicting link quality on a per cell basis with location information.

In large cells it may also be interesting to know which part of the cell is experiencing quality problems. The present invention can also include a location detection scheme, to determine the origin of high FER within a cell. The location information is sent to the MSC and stored together with the FER information to enable the operator to identify specific quality problem areas within cells using, for example, menu option (4) in FIG. 4 to display the FER problems on a grid at any of the three (or other) hierarchical levels (connection cell, or system). An example of this type of display format is provided as FIG. 5(d).

Location detection of a mobile station can, for example, be realized using the global positioning system (GPS), signal strength measurements of/by surrounding cells, or adaptive antennas possibly combined with time alignment. A discussion of these known techniques for determining mobile station location is beyond the scope of this specification. However, the interested reader is referred to U.S. patent application Ser. No. 08/597,073 entitled "Terminal Position Location Using Multiple Beams", the disclosure of which is incorporated here by reference.

Figure 5E:
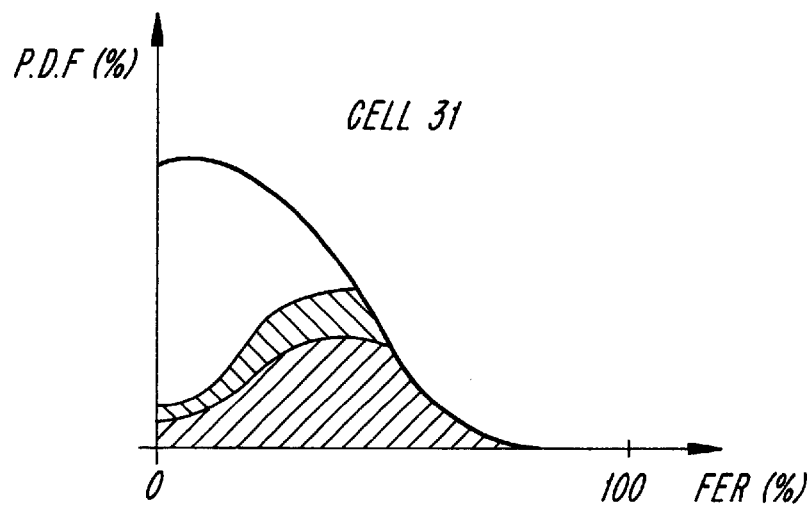
FIG. 5(e) is an exemplary graphical output which illustrates link quality in a cell that takes handoff into account.

Additionally, the handoff procedures described above may cause a large number of frame erasures if the algorithm used to determine when handoff is appropriate has improperly weighted parameters. Hence, to enable the network operator to discover quality problems related to handover, the FER reports just before and after handover (corresponding to a change of the active set in the case of soft handover) could be marked with specific identifiers. When the data is presented to the operator who has selected menu option (5) of FIG. 4, the marked FER are presented in a different way (e.g., highlighted or different colors) compared to "ordinary" FER which are related to connections which are not involved in a handoff. This concept is illustrated in FIG. 5(e).

Figure 5F:
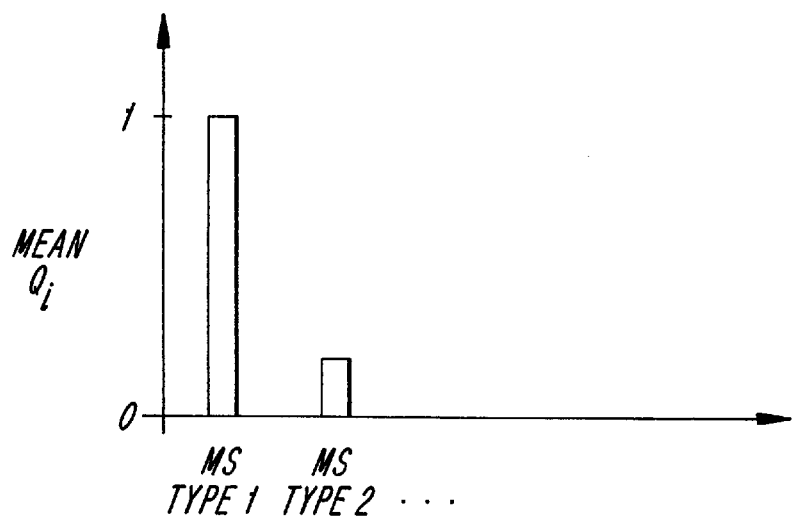
FIG. 5(f) is an exemplary graphical output which illustrates link quality based on the type of equipment used to make the connection.

Certain mobile station types may not work according to the specification, and thus cause major quality problems. If the equipment identity number (e.g. IMEI in GSM) is collected and stored in the MSC, it is possible to determine which mobile station types caused high FER. The option to display mobile station type or manufacturer along with the FER information could also be provided to the menu of FIG. 4 to provide additional information for the network generator to understand the quality issues surrounding a particular connection, cell or system. This might result, for example, in a display format illustrated in FIG. 5(f) wherein two different mobile types are illustrated along with their corresponding Q values.

Figure 6:
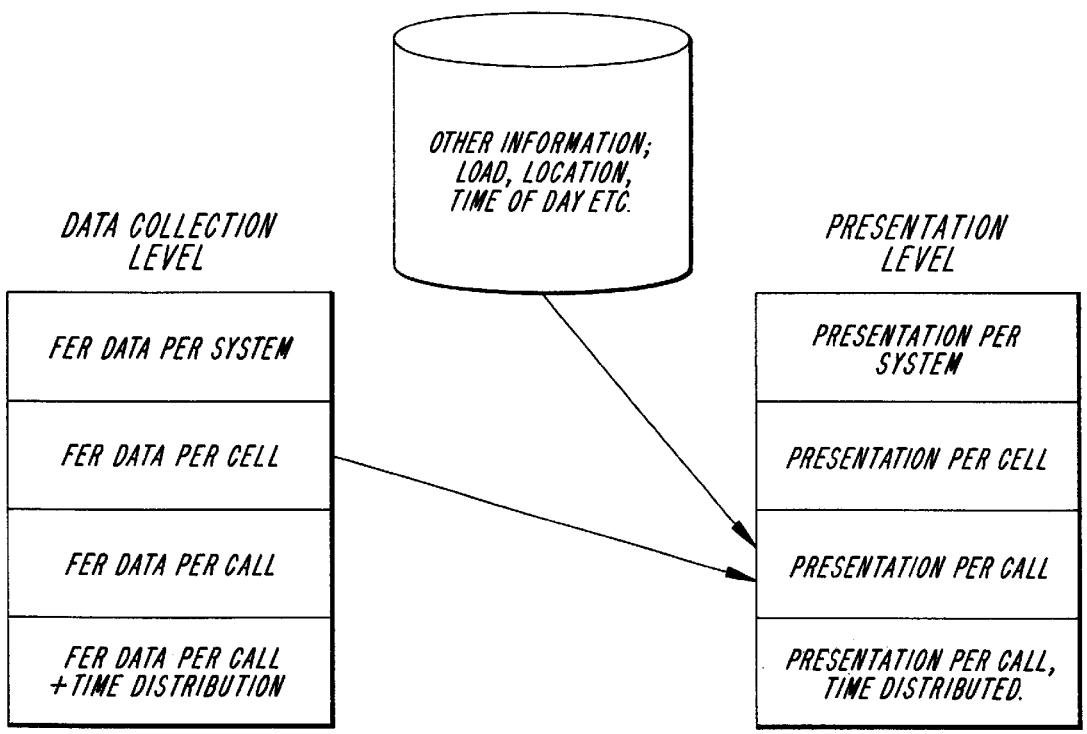
FIG. 6 illustrates link quality data transformation between a higher level of received link quality data and a lower level of presented link quality data.

The foregoing exemplary embodiments illustrate techniques according to the present invention wherein link quality information can be depicted at different levels, e.g., on a per connection basis, a per cell or cell group basis, or a system-wide basis. However, Applicants have recognized that, in some cases, data may only be available on higher levels than the level at which a network operator wishes to observe quality. For example, the system may only be designed to provide information to terminal 24 on a per cell basis and yet the network operator may wish to evaluate the quality of a particular connection. When it is desired to present quality information on a lower level than that at which it is reported to the output terminal, higher level data can be transformed into the required form and then presented. This may be accomplished using transformations which involve other information, e.g., cell/area identification, location of the mobile station, speed of the mobile station, time of day, system loading, and other network characteristics. As will be appreciated by those skilled in the art, these transformations may be derived from earlier systems statistics and can provide only estimates of the desired lower level quality values. This concept is illustrated in FIG. 6.

Therein, on the left side of the figure, various exemplary data collection levels are listed in descending level order. On the right side of the figure, corresponding presentation levels are also illustrated in descending level order. In the particular example indicated by the arrows, the processing node of the system receives frame erasure rate data on a per cell level, however, a network operator is requesting a presentation of link quality information on a per call basis. Since the required presentation level is lower than the available data collection-level, other information, as described above, is also used in conjunction with the available per cell FER data to arrive at an estimate of per call quality which may then be presented on the output terminal. Of course, those skilled in the art will appreciate that the four levels illustrated in FIG. 6 are merely exemplary and that other levels may also be provided.

The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for analyzing and presenting network quality in formation comprising the steps of:
   gathering link quality information at a central node pertaining to a plurality of connections within a plurality of cells supported by said network;
   selecting one of a plurality of display views including per-connection basis, per-cell basis and network-wide basis, and
   displaying said link quality information using said selected view wherein said link quality information is transmitted, after decoding, to said central node and is based on signal quality.

2. The method of claim 1 further comprising the steps of:
   correlating said link quality information to be selectively displayed with a geographical location of at least one mobile station; and
   displaying said correlated link quality information.

3. The method of claim 1, further comprising the steps of:
   correlating said link quality information to be selectively displayed with a handover status of at least one mobile station; and
   displaying said correlated link quality information.

4. The method of claim 1, further comprising the steps of:
   correlating said link quality information to be selectively displayed with equipment type of at least one mobile station; and
   displaying said correlated link quality information.

5. The method of claim 1, wherein said step of gathering further comprises:
   gathering frame erasure information.

6. The method of claim 5, wherein said frame erasure information includes a time distribution of said frame erasures.

7. A method for outputting quality information comprising the steps of:
   receiving, at a central node, link quality information associated with a link between a base station and a mobile station at a first level; and
   outputting, at a network operator terminal, said link quality information at a second level different from said first level, said second level derived from said link quality information received at said first level;
   wherein said first level is higher than said second level and said method further comprises the step of:
      estimating said link quality information at said second level using said link quality information at said first level and at least one other network parameter.

8. The method of claim 7, wherein said first level is on a per connection basis.

9. The method of claim 7, wherein said first level is on a per cell basis.

10. The method of claim 7, wherein said second level is on a per connection basis.

11. The method of claim 7, wherein said first second is on a per cell basis.

12. The method of claim 7, wherein said second level is on a per system-wide basis.

13. A method for outputting quality information comprising the steps of:
   receiving, at a central node, link quality information associated with a link between a base station and a mobile station at a first level; and
   outputting, at a network operator terminal, said link quality information at a second level different from said first level, said second level derived from said link quality information received at said first level;
   wherein said first level is higher than said second level and said method further comprises the step of:
      estimating said link quality information at said second level using said link quality information at said first level and at least one other network parameter;
      wherein said at least one other network parameter includes at least one of network loading, cell identity, mobile station location, time of day and mobile station speed.

* * * * *